US008352256B2

(12) United States Patent
Fischer

(10) Patent No.: US 8,352,256 B2
(45) Date of Patent: *Jan. 8, 2013

(54) ADAPTIVE REDUCTION OF NOISE SIGNALS AND BACKGROUND SIGNALS IN A SPEECH-PROCESSING SYSTEM

(75) Inventor: Joern Fischer, Freiburg (DE)

(73) Assignee: Entropic Communications, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/895,817

(22) Filed: Sep. 30, 2010

(65) Prior Publication Data

US 2011/0022382 A1 Jan. 27, 2011

Related U.S. Application Data

(63) Continuation of application No. 11/507,369, filed on Aug. 21, 2006, now Pat. No. 7,822,602.

(30) Foreign Application Priority Data

Aug. 19, 2005 (DE) ........................ 10 2005 039 621

(51) Int. Cl.
*G10L 21/02* (2006.01)
*G10L 11/02* (2006.01)
*G10L 19/14* (2006.01)
*H04B 15/00* (2006.01)
*G06F 15/00* (2006.01)

(52) U.S. Cl. ........ 704/224; 704/200; 704/206; 704/225; 381/94.1

(58) Field of Classification Search .................. 704/200, 704/205–210, 224–229, E19.001–E19.006; 381/73.1, 94.1–96
See application file for complete search history.

(56) References Cited

U.S. PATENT DOCUMENTS

| | | | | |
|---|---|---|---|---|
| 3,975,587 | A * | 8/1976 | Dunn et al. | 704/208 |
| 4,133,976 | A * | 1/1979 | Atal et al. | 704/226 |
| 4,403,298 | A * | 9/1983 | May, Jr. | 708/322 |
| 4,658,426 | A | 4/1987 | Chabries et al. | |
| 5,008,937 | A | 4/1991 | Yamamura et al. | |
| 5,146,470 | A * | 9/1992 | Fujii et al. | 375/350 |
| 5,148,488 | A | 9/1992 | Chen et al. | |

(Continued)

FOREIGN PATENT DOCUMENTS

EP 0558312 A1 9/1993

(Continued)

OTHER PUBLICATIONS

Tugay et al., "Poreoperties of the momentum LMS algorithm," Proceedings integrating research, industry and education in energy and communication engineering electrotechnical conference, p. 197-200 (1989).*

(Continued)

*Primary Examiner* — Pierre-Louis Desir
*Assistant Examiner* — David Kovacek
(74) *Attorney, Agent, or Firm* — Duane Morris LLP

(57) ABSTRACT

An audio input signal is filtered using an adaptive filter to generate a prediction output signal with reduced noise, wherein the filter is implemented using a plurality of coefficients to generate a plurality of prediction errors and to generate an error from the plurality of prediction errors, wherein the absolute values of the coefficients are continuously reduced by a plurality of reduction parameters.

22 Claims, 3 Drawing Sheets

U.S. PATENT DOCUMENTS

| | | | | | |
|---|---|---|---|---|---|
| 5,295,192 | A * | 3/1994 | Hamada et al. | 381/71.12 |
| 5,303,173 | A | 4/1994 | Mori et al. | |
| 5,412,735 | A * | 5/1995 | Engebretson et al. | 381/317 |
| 5,500,903 | A | 3/1996 | Gulli | |
| 5,512,959 | A * | 4/1996 | D'Alto et al. | 348/614 |
| 5,537,647 | A | 7/1996 | Hermansky et al. | |
| 5,583,968 | A | 12/1996 | Trompf | |
| 5,590,241 | A * | 12/1996 | Park et al. | 704/227 |
| 5,627,896 | A * | 5/1997 | Southward et al. | 381/71.11 |
| 5,638,311 | A * | 6/1997 | Fujii et al. | 708/322 |
| 5,651,090 | A * | 7/1997 | Moriya et al. | 704/200.1 |
| 5,657,350 | A * | 8/1997 | Hofmann | 375/241 |
| 5,689,572 | A * | 11/1997 | Ohki et al. | 381/71.3 |
| 5,706,402 | A * | 1/1998 | Bell | 706/22 |
| 5,953,410 | A * | 9/1999 | Pfeil et al. | 379/406.05 |
| 5,982,901 | A * | 11/1999 | Kane et al. | 381/13 |
| 6,154,547 | A * | 11/2000 | Whitecar | 381/94.2 |
| 6,418,408 | B1 * | 7/2002 | Udaya Bhaskar et al. | 704/219 |
| 6,484,133 | B1 | 11/2002 | Vogt | |
| 6,529,606 | B1 * | 3/2003 | Jackson et al. | 381/71.4 |
| 6,757,654 | B1 * | 6/2004 | Westerlund et al. | 704/262 |
| 6,804,640 | B1 * | 10/2004 | Weintraub et al. | 704/226 |
| 6,820,053 | B1 | 11/2004 | Ruwisch | |
| 6,959,274 | B1 * | 10/2005 | Gao et al. | 704/219 |
| 6,975,689 | B1 * | 12/2005 | McDonald et al. | 375/316 |
| 7,092,537 | B1 * | 8/2006 | Allred et al. | 381/103 |
| 7,146,315 | B2 * | 12/2006 | Balan et al. | 704/233 |
| 7,191,122 | B1 * | 3/2007 | Gao et al. | 704/223 |
| 7,433,908 | B2 * | 10/2008 | Tanrikulu et al. | 708/322 |
| 7,464,029 | B2 * | 12/2008 | Visser et al. | 704/210 |
| 7,734,466 | B2 * | 6/2010 | Barron et al. | 704/244 |
| 7,822,602 | B2 * | 10/2010 | Fischer | 704/227 |
| 2001/0022812 | A1 * | 9/2001 | Ise et al. | 375/232 |
| 2004/0095994 | A1 * | 5/2004 | Dowling | 375/222 |
| 2005/0159945 | A1 | 7/2005 | Otsuka et al. | |
| 2005/0261898 | A1 * | 11/2005 | Van Klinken | 704/219 |
| 2006/0013383 | A1 * | 1/2006 | Barron et al. | 379/406.01 |
| 2006/0072379 | A1 | 4/2006 | Ochi | |
| 2006/0078210 | A1 | 4/2006 | Simard et al. | |
| 2006/0198538 | A1 * | 9/2006 | Malvar et al. | 381/95 |
| 2007/0043559 | A1 * | 2/2007 | Fischer | 704/219 |
| 2007/0297619 | A1 * | 12/2007 | Pan | 381/71.11 |
| 2008/0095383 | A1 * | 4/2008 | Pan et al. | 381/71.11 |
| 2011/0022382 | A1 * | 1/2011 | Fischer | 704/219 |

FOREIGN PATENT DOCUMENTS

| | | | |
|---|---|---|---|
| EP | 0579152 | A1 | 1/1994 |
| EP | 1080465 | A1 | 3/2001 |
| EP | 1617419 | A2 | 1/2006 |

OTHER PUBLICATIONS

Murat Cabuk, "Adaptive Step Size and Exponentially Weighted Affine Projection Algorithms", Dissertation, Bogazici University, Turkey 1998.

Richard D. Gitlin et al., "On the Design of Gradient Algorithms for Digitally Implemented Adaptive Filters", IEEE Transactions on Circuit Theory, vol. 20, No. 2, pp. 125-136, 1973.

Michael J. Reed et al., "An analysis of LMS adaptive two-sided transversal filters", International Conference on Acoustics, Speech, and Signal Processing 1991, vol. 3, pp. 2145-2148, 1991.

Emilio Soria et al., "A Novel Approach to Introducing Adaptive Filers Based on the LMS Algorithm and Its Variants", IEEE Transactions on Education, vol. 47, No. 1, pp. 127-133, 2004.

Mehmet Ali Tugay, "Properties of the Momentum LMS Algorithm", Proceedings Integrating Research, Industry and Education in Energy and Communication Engineering Electrotechnical Conference, pp. 197-200, 1989.

Bernard Widrow, "Adaptive Filters", Aspects of Network and system Theory, R. E. Kalman and N. DeClaris (Edit.), Holt, Rinehart & Winston, New York, pp. 563-586, 1971.

* cited by examiner

ADAPTIVE REDUCTION OF NOISE SIGNALS AND BACKGROUND SIGNALS IN A SPEECH-PROCESSING SYSTEM

PRIORITY INFORMATION

This patent application claims priority from German patent application 10 2005 039 621.6 filed Aug. 19, 2005, which is hereby incorporated by reference.

BACKGROUND INFORMATION

The invention relates to the field of signal processing, and in particular to the field of adaptive reduction of noise signals in a speech processing system.

In speech-processing systems (e.g., systems for speech recognition, speech detection, or speech compression) interference such as noise and background noises not belonging to the speech decrease the quality of the speech processing. For example, the quality of the speech processing is decreased in terms of the recognition or compression of the speech components or speech signal components contained in an input signal. The goal is to eliminate these interfering background signals with the smallest computational cost possible.

EP 1080465 and U.S. Pat. No. 6,820,053 employ a complex filtering technique using spectral subtraction to reduce noise signals and background signals wherein a spectrum of an audio signal is calculated by Fourier transformation and, for example, a slowly rising component is subtracted. An inverse transformation back to the time domain is then used to obtain a noise-reduced output signal. However, the computational cost in this technique is relatively high. In addition, the memory requirement is also relatively high. Furthermore, the parameters used during the spectral subtraction can be adapted only very poorly to other sampling rates.

Other techniques exist for reducing noise signals and background signals, such as center clipping in which an autocorrelation of the signal is generated and utilized as information about the noise content of the input signal. U.S. Pat. Nos. 5,583,968 and 6,820,053 disclose neural networks that must be laboriously trained. U.S. Pat. No. 5,500,903 utilizes multiple microphones to separate noise from speech signals. As a minimum, however, an estimate of the noise amplitudes is made.

A known approach is the use of an finite impulse response (FIR) filter that is trained to predict as well as possible from the previous n values the input signal composed of, for example, speech and noise, this being achieved using linear predictive coding (LPC). The output values of the filter are these predicted values. The values of the coefficients c(i) of this filter on average rise for noise signals more slowly than for speech signals, the coefficients being computed by the equation:

$$c_i(t+1)=c_i(t)+\mu\cdot e\cdot s(t-i) \quad (1)$$

where μ<<1, for example, μ=0.01 is a learning rate, s(t) is an audio input signal at time t, e=s(t)−sv(t) is an error resulting from a difference of all the individual prediction errors from the audio input signal, sv(t) is the output signal resulting from the sum of the terms $c_i(t-1)\cdot s(t-i)$, that is, of the individual prediction errors over all i of 1 through N, N is the number of coefficients, and $c_i(t)$ is an individual coefficient having a parameter i at time t.

There is a need for a system of reducing noise signals and background signals in a speech-processing system.

SUMMARY OF THE INVENTION

An audio input signal is filtered using an adaptive filter to generate a prediction output signal with reduced noise, wherein the filter is implemented using a plurality of coefficients to generate a plurality of prediction errors and to generate an error from the plurality of prediction errors, where the absolute values of the coefficients are continuously reduced by a plurality of reduction parameters.

The continuous reduction of coefficients may be generated by an approach in which the coefficients are multiplied by a factor less than 1, for example, by a factor between 0.8 and 1.0.

The coefficients $c_i(t)$ may be computed according to the equation:

$$c_i(t+1)=c_i(t)+(\mu\cdot e\cdot s(t-i))-kc_i(t)$$

where

- k with 0<k<<1, in particular, k<=0.0001 is a reduction parameter,
- μ<<1, in particular, μ<=0.01 is a learning rate,
- s(t) is an audio input signal at time t,
- e is an error resulting from the difference of all the individual prediction errors (sv1-sv4) from audio input signal s(t),
- sv(t) is the prediction output signal resulting from a sum of all the individual prediction errors, where N is the number of coefficients $c_i(t)$, and
- $c_i(t)$ is an individual coefficient with an index i at time t.

The coefficients may also be computed according to the equation:

$$ci(t+1)=ci(t)+\mu\cdot e\cdot s(t-i)-kci(t)$$

where e=S(t)−sv(t) and sv(t)=Σi=1 . . . N ci(t−1)·s(t−i).

The prediction output signal may be used as a prediction of the audio input signal with reduced noise as the input signal for a following second filter in order to generate a second prediction. The second filter may include a prediction filter having a set of second coefficients, wherein a learning rate to adapt the coefficients is selected so as to be several powers of ten smaller than a learning rate of the first filter. The second prediction may be subtracted from the prediction output signal to eliminate sustained background noise.

A learning rule to determine the additional coefficients may be asymmetrical such that the absolute values of the subsequent coefficients fall in absolute value more significantly than they rise, and can rapidly fall to zero, but rises only with a small gradient.

In one embodiment, the sign of the audio input signal may be is used to determine individual prediction errors in order not to disadvantageously affect small signals.

The coefficients may be limited to prevent drifting of the coefficients to a range of, for example, −4 . . . 4, when the audio input signal is normalized from −1 . . . 1.

A maximum for a speech signal component of the audio input signal may be detected, and the output signal is renormalized to this maximum, in particular, in a trailing approach.

The output signal of the first and/or second filter relative to the filter's input signal may be used, for example, simultaneously as a measure of the presence of speech in the input signal.

The first and/or second filter may implement error prediction using a least mean squares (LMS) adaptation. A FIR filter may be used for the first and/or second filter.

A sigmoid function may be multiplied by the prediction output signal to prevent an overmodulation of the signal in case of a bad prediction.

The audio input signal may be mixed with the prediction output signal as the original signal to generate a natural sound.

An adaptive filter may filter the audio input signal to generate a prediction output signal with reduced noise and a memory stores a plurality of coefficients for the filter. The filter is designed or configured to generate a plurality of prediction errors and to generate an error resulting from the plurality of prediction errors, wherein a coefficient supply arrangement continuously reduces the absolute values of the coefficients using at least one reduction parameter.

What is preferred in particular is a device comprising a multiplier to weight the optionally time-delayed audio input signal, or to weight the prediction output signal by a weighting factor smaller than one, in particular, for example, 0.1, and an adder to add the weighted signal to the prediction output signal or to the prediction to generate a noise-reduced output signal.

In contrast to EP 1080465 and U.S. Pat. No. 6,820,053, the computational cost of a system or method according to the present invention is smaller by at least an order of magnitude. In addition, the memory requirement is smaller by at least an order of magnitude. Furthermore, the problem of poor adaptation of the parameters used to other sampling rates, as with spectral subtraction, is eliminated or at least significantly reduced.

By comparison to known methods, the computational cost is reduced. While the computational cost for a Fourier transformation is in the range of $O(n(\log(n)))$, and the computational cost for an autocorrelation is in the range of $O(n^2)$, the computational cost for the embodiment of the present invention comprising two filter stages is in the range of only $O(n)$, where n is a number of samples read (sampling points) of the input signal and O is a general function of the filter cost.

Advantageously, a speech signal is delayed only by a single sample. In addition, an adaptation for noise is instantaneous, while for sustained background noise the adaptation is preferably delayed by 0.2 s to 5.0 s.

Processing according to the present invention is significantly less computationally costly than conventional techniques. For example, four coefficients enables one to obtain respectable results, with the result that only four multiplications and four additions must be computed for the prediction of a sample, and only four to five additional operations are required for the adaptation of the filter coefficients.

An additional advantage is the lower memory requirement relative to known methods, such as, for example, spectral subtraction. Processing according to the present invention allows for a simple adjustment of the parameters even in the case of different sampling rates. In addition, the strength of the filter for noise and for sustained background signals can be adjusted separately.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
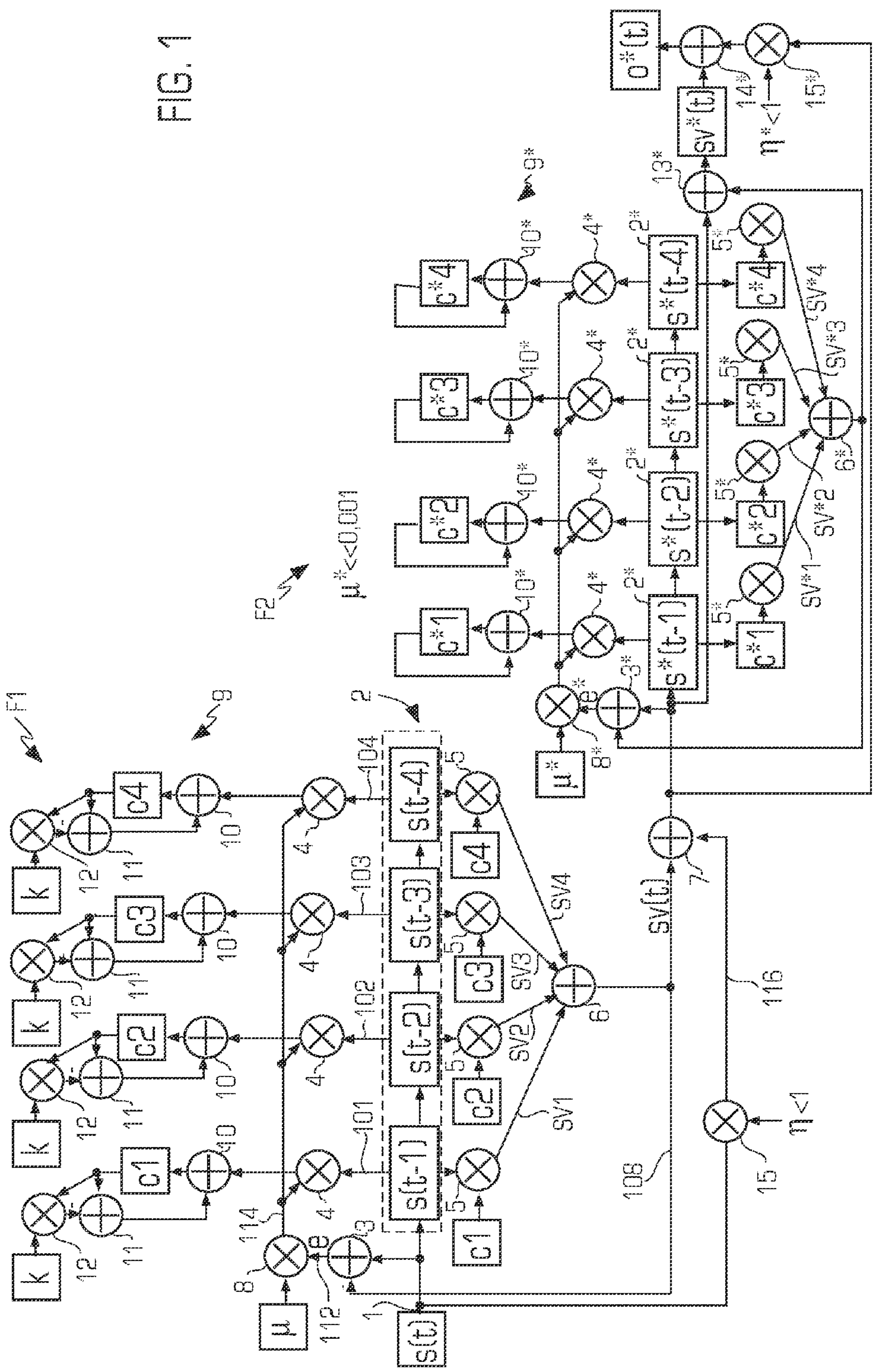
FIG. 1 illustrates a filter arrangement for the reduction of noise signals and background signals in a speech-processing system comprising two serially connected filter stages.

FIG. 1 illustrates two adaptive filters F1, F2 which are serially connected as a first filter stage and a second filter stage. The first filter stage may be used on a stand-alone basis.

The first filter F1 receives an audio input signal s(t) on a line 1, and the audio input signal is applied to a group of delay elements 2. Each of the delay elements may be configured for example, as a buffer which delays the given applied value of the audio input signal s(t) by a given clock cycle. In addition, the audio input signal s(t) on the line is fed to a first adder 3. The delayed values s(t-1)-s(t-4) on lines 101-104 respectively are applied to a corresponding one of a first multiplier 4 and a corresponding one of a second multiplier 5. One coefficient each c1-c4 of an adaptive filter is also applied to the group of second multipliers 5. The resultant products output from the group of second multipliers 5 are outputted as prediction errors sv1-sv4 to a second adder 6. A temporal sequence of addition values from the second adder 6 forms a prediction output signal sv(t) on a line 108.

Figure 2:
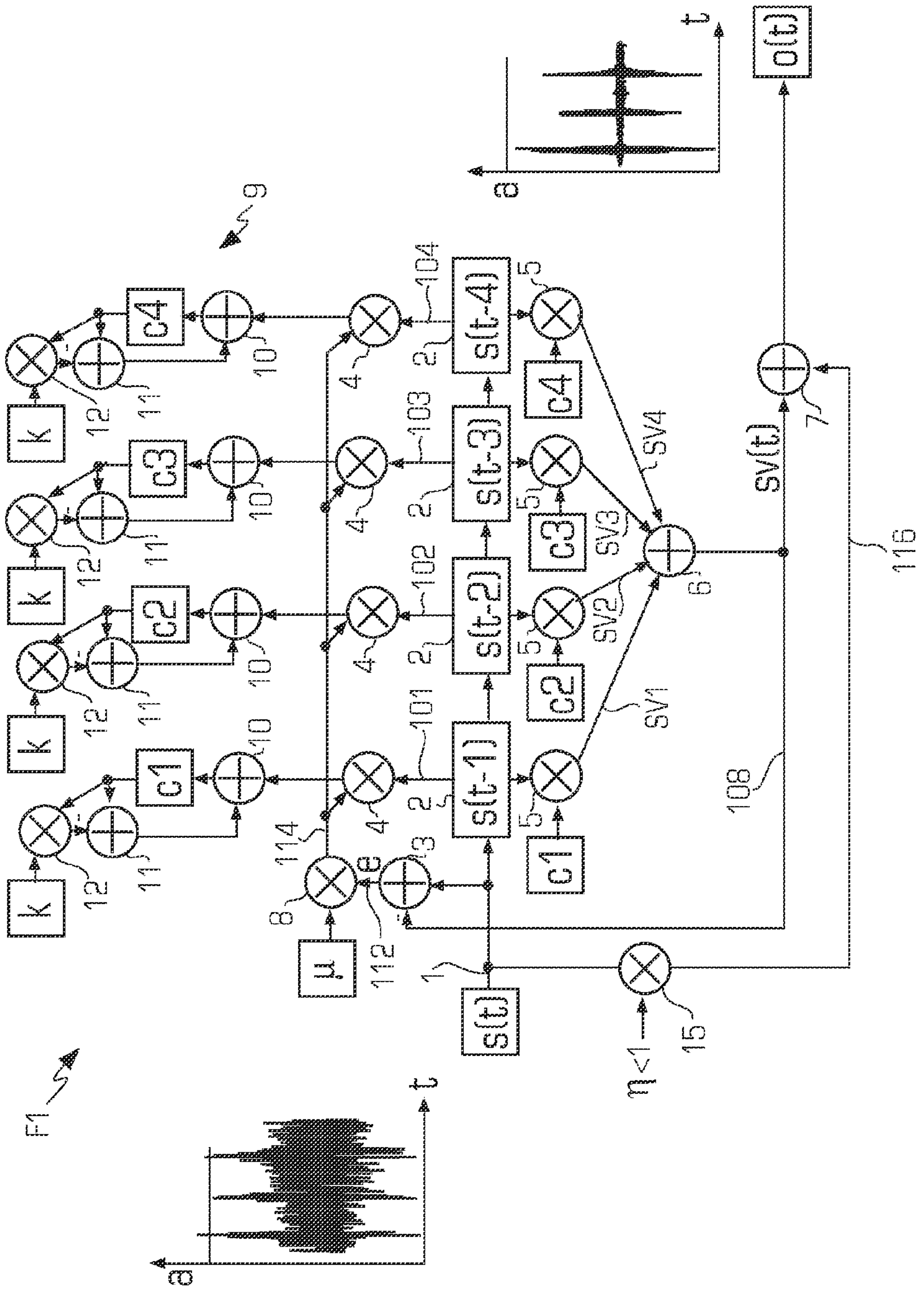
FIG. 2 is an enlarged view of the first of the two filter stages illustrated in FIG. 1.

In one embodiment, the sequence of values of prediction output signal sv(t) is output directly in order to generate an output signal o(t) (see FIG. 2).

The sequence of values of the prediction output signal sv(t) is applied to a first adder 3 that also receives the audio input signal s(t). The resulting difference is output as an error e on a line 112. The signal error e on the line 112 is applied to a third multiplier 8, which also receives a learning rate where preferably value $\mu \approx 0.01$. The resultant product is output on a line 114 to the group of first multipliers 4 to be multiplied by the delayed values s(t-1)-s(t-4).

The multiplication results from the group of first multipliers 4 are input to a corresponding group of third adders 10, which form an input of a coefficient supply arrangement 9. The output values from the group of third adders 10 form the coefficients c1-c4 which are applied to the corresponding multipliers from the group of second multipliers 5. These coefficients c1-c4 are also applied to an associated adder from a group of fourth adders 11, and one multiplier each of a group of fourth multipliers 12. A reduction parameter k is applied to the group of fourth multipliers 12, where the value of the reduction parameter k may be, for example, 0.0001. The corresponding multiplication result from the fourth multipliers 12 is applied to the corresponding one of the fourth adders 11 which provides a difference signal that is feedback to the corresponding third adder 10. The respective addition value from the group of fourth adders 11 is added by the group of third adders 10 to the respective applied and delayed audio signal value s(t-1)-s(t-4) in order to learn the coefficients.

Optionally, as shown in FIG. 2, a weighted value on a line 116 may be added by an adder 7 to the prediction output signal sv(t) on the line 108 to generate the output signal o(t). The weighted value on the line 116 is generated directly from the instantaneous value, or from a corresponding delayed value, of the audio input signal s(t). The weighted value may be supplied by a weighting multiplier 15 that multiplies the input signal s(t) on the line 1 by a factor $\eta < 1$, for example $\eta \approx 0.1$.

Preferably, the prediction output signal sv(t), or the output signal o(t), is not output as the final output signal but is input to a second filter stage having the second filter F2 for further processing.

Figure 3:
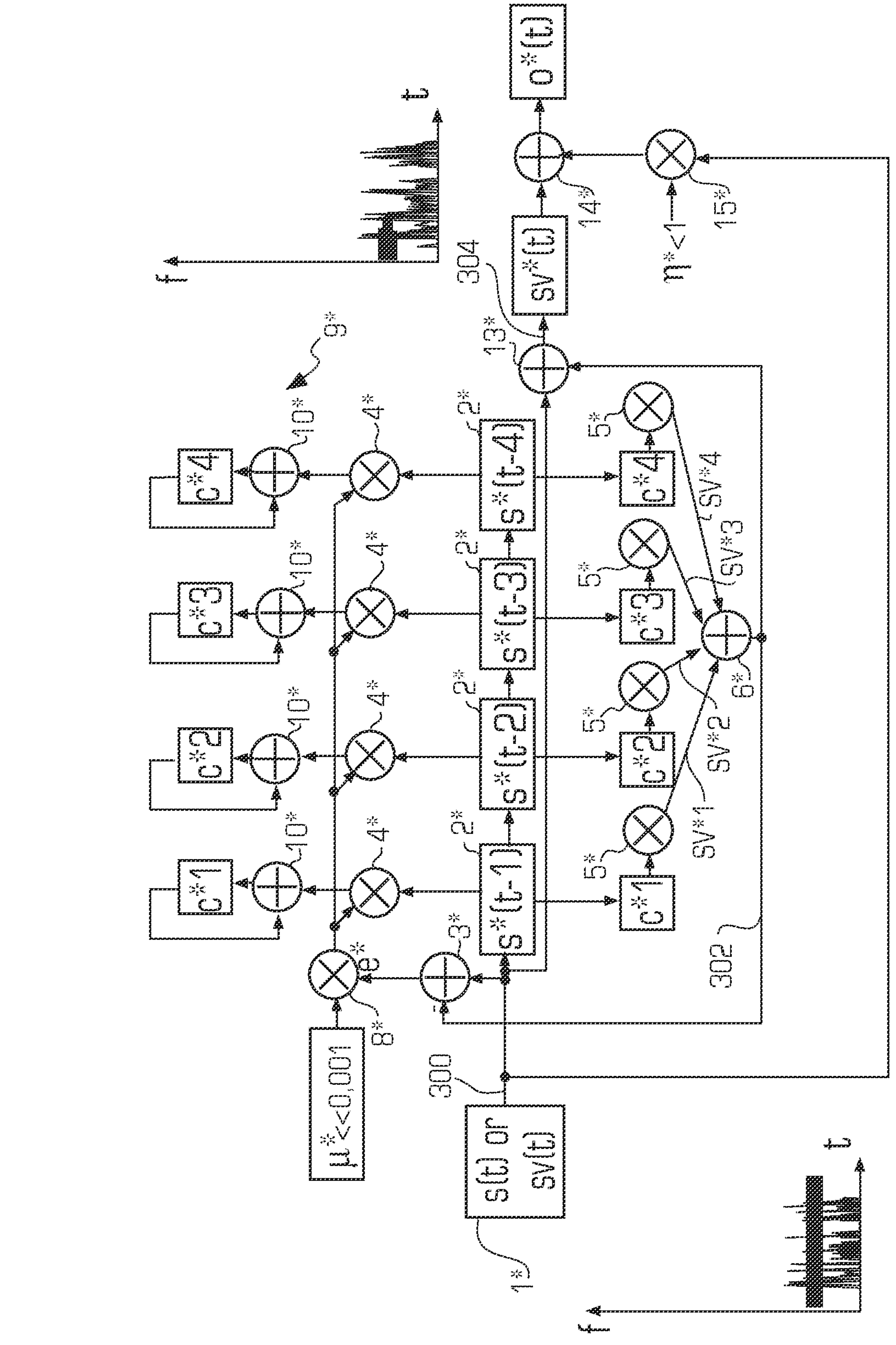
FIG. 3 is an enlarged view of the second of the two filter stages illustrated in FIG. 1.

As is shown in FIG. 3, the second filter F2 is another adaptive filter arrangement, its design being similar to the design of the first filter staged. As a result, in the interests of brevity the following description refers only to differences from the first filter stage. The respective components and signals or values are identified by an asterisk to differentiate them from the corresponding components and signals or values of the first filter stage.

One difference relates to the generation of coefficients **c*1-c*4 in a coefficient supply device 9* modified relative to the first filter stage. The coefficients c*1-c*4 are generated in using, for example, an adaptive FIR filter without multiplication by a reduction parameter k. Another difference relative to both the first filter stage of the first filter F1**, and also relative to a conventional FIR filter, includes the fact that the value of a learning rate μ* for the second filter F2 is selected to be smaller, in particular, significantly smaller than the value of learning rate μ of the first filter F1.

The multipliers 5* provide a plurality of product values, for example sv*1, sv*2, sv*3 and sv*4 to adder 6* and the resultant sum is output on a line 302. The signal on the line 302 is input to a summer 13* that also receives the input signal on line 300 and provides a difference signal on line 304 indicative of prediction value sv*(t). Preferably, the values of the prediction value sv*(t) are added by a sixth adder 14* to the optionally time-delayed and weighted audio input signal s(t) or sv(t) in order to generate a noise-reduced audio output signal o*(t). A multiplication of the audio input signal s(t) on the line 300 by a weighting factor η*<1, for example, η≈0.1, serves to effect a weighting, the multiplication being performed in a multiplier 15* that is connected ahead of the sixth adder 14*. To control the procedural steps, the arrangement has, using the conventional approach, additional components, or it is connected to additional components such as, for example, a processor for control functions and a clock generator to supply a clock signal. In order to store the coefficients c1-c4, **c*1-c*4**, and additional values as necessary, the arrangement may also include a memory or is able to access a memory.

The first filter F1 reduces the noise over the perceived frequency range. At the same time, a modified adaptive FIR filter is trained to predict from previous n values the audio input signal s(t) which contains, for example, speech and noise. The output includes the predicted values in the form of the prediction output signal sv(t). The absolute values of the general coefficients $c_i(t)$ having an index i=1, 2, 3, 4, as in FIG. 1, and accordingly coefficients C1-C4 of this type of first filter F1 increase more slowly for noise signals than for speech signals.

Filtering is effected analogously to linear predictive coding (LPC). Instead of a delta rule or a least mean squares (LMS) learning step, here a modified filter technique may be used in which coefficients $c_i(t)$ are generally computed according to a new learning rule as specified by:

$$c_i(t+1)=c_i(t)+(\mu\cdot e\cdot s(t-i))-kc_i(t) \quad (2)$$

where $$e=S(t)-sv(t) \quad (3)$$

$$sv(t)=\Sigma_{i=1\,\ldots\,N}c_i(t-1)\cdot s(t-i) \text{ and} \quad (4)$$

where k with 0<k<<1, for example, k=0.0001 is a reduction parameter; μ<<1, for example, .mu.=0.01 is a learning rate; s(t) is an audio input signal at time t; e is an error based on the difference of the individual prediction errors from the audio input signal; sv(t) is a prediction output signal based on the sum of coefficients multiplied by the associated delayed signals; N is the number of coefficients $c_i(t)$; and $c_i(t)$ is an individual coefficient with a parameter or index i at time t.

Based on the learning rule using reduction parameter k, the absolute values of the coefficients $c_i(t)$ are reduced continuously, which results in smaller predicted amplitudes for noise signals than for speech signals. The reduction parameter k is also used to define how strongly the noise should be suppressed.

The second filter F2 reduces sustained background noise. Here the fact is exploited that the energy of speech components in the audio input signal s(t) within individual frequency bands repeatedly falls to zero, whereas sustained sounds tend to have constant energy in the frequency band. An adaptive FIR filter with a relatively small learning rate, for example μ=0.000001, is adapted for a prediction using, for example LPC at a slow enough rate that the speech signal component in audio input signal s(t) is predicted to have a much smaller amplitude than sustained signals. Subsequently, the prediction sv*(t) thus obtained in the second filter F2 is subtracted from the input signal s(t) such that the sustained signals from the input signal s(t) are eliminated, or at least significantly reduced.

The first and second filters F1, F2 operate relatively efficiently if they are implemented serially acting on the input signal s(t), as is shown in FIG. 1. Here the first filter F1 is implemented first, and its output or prediction output signal sv(t) is passed as an input signal to the second filter F2 for subsequent filtering.

Advantageously, while the input signal s(t) contains speech and noise, prediction output signal sv(t) of the first filter F1 contains speech and comparatively reduced noise.

The figures illustrate an amplitude curve a over time t for, respectively, an exemplary input signal s(t) and prediction output signal sv(t) within the time domain, before and after filtering by the second filter F2 to suppress sustained background noise. Here the x axis represents time t, the y axis represents a frequency f, and a brightness intensity represents an amplitude. What is evident is a spectrum for a prominent 2 kHz sound in the background before the second filter F2 as compared with a spectrum having a reduced 2 kHz sound after the second filter F2.

Instead of a continuous reduction of the coefficients c1-c4 according to equation (2), in an alternative embodiment, reduction of the coefficients $c_i(t)$ may be generated by multiplying the coefficients $c_i(t)$ by a fixed or variable factor between, in particular, 0.8 and 1.0.

It is further contemplated that after using the first filter F1, a sigmoid function, for example, a hyperbolic tangent, is multiplied by the filter's prediction output signal sv(t), which approach prevents overmodulation of the signal in the event of a bad prediction.

Advantageously, the audio input signal s(t) is mixed into the prediction output signal sv(t) as the original signal in order to produce a natural sound.

Instead of a single reduction parameter k for all the coefficients c1-c4, it is also possible to define or determine multiple reduction parameters for the different coefficients c1-c4 individually. In particular, the reduction parameter(s) may also be varied as a function of, for example, the received audio input signal.

Although the present invention has been illustrated and described with respect to several preferred embodiments thereof, various changes, omissions and additions to the form and detail thereof, may be made therein, without departing from the spirit and scope of the invention.

What is claimed is:

1. A method for reducing noise signals and background signals in a speech-processing system, comprising:

adaptively filtering, using a first filter, an audio input signal to generate a prediction output signal using a plurality of coefficients to generate a plurality of prediction errors and generating an error from the plurality of prediction errors, where the prediction output signal is the sum of the plurality of prediction errors;

using a multiplier to weight the audio input signal or to weight the prediction output signal by a weighting factor smaller than one to generate a weighted signal; and using an adder to add the weighted signal to the prediction output signal to generate a noise-reduced audio output signal.

2. The method of claim 1, where the prediction output signal as a prediction of the audio input signal with reduced noise is used as an input signal for a second filter to generate a second prediction output signal.

3. The method of claim 2, where the second filter comprises a prediction filter having a second filter with a set of second coefficients, wherein a learning rate to adapt the second coefficients is selected that is several powers of ten less than a learning rate of the first filter.

4. The method of claim 3, comprising, subtracting the second prediction output signal from the prediction output signal.

5. The method of claim 4, where a learning rule is asymmetrically designed to determine the second coefficients such that the absolute values of the second coefficients fall more significantly in absolute value than they rise and can rapidly fall to zero, but rise only with a small gradient.

6. The method of claim 1, where the filtering is configured to operate only on the sign of the audio input signal.

7. The method of claim 1, where the coefficients are limited to prevent drifting of the coefficients when the audio input signal is normalized from −1 . . . 1.

8. The method of claim 1, where a maximum of a speech signal component of the audio input signal is detected, and an output signal is renormalized to this maximum.

9. The method of claim 1, where an output signal of the first and/or second filter relative to its input signal is used as a measure for the presence of speech in the input signal.

10. The method of claim 1, where the step of adaptively filtering comprises least mean squares processing.

11. The method of claim 10, where the step of adaptively filtering comprises FIR filtering.

12. The method of claim 1, comprising multiplying a sigmoid function by the prediction output signal to prevent an overmodulation of the signal in case of a bad prediction.

13. The method of claim 1, comprising mixing the audio input signal with the prediction output signal.

14. The method of claim 1, further comprising programming an application-specific integrated circuit.

15. A device for the reduction of noise signals and background signals in a speech-processing system, comprising:

an adaptive filter that filters an audio input signal and provides a prediction output signal with reduced noise;

memory that stores a plurality of coefficients for the adaptive filter;

wherein the adaptive filter is configured to generate a plurality of prediction errors and an error from the plurality of prediction errors, where a coefficient supply circuit reduces the absolute values of the coefficients using at least one reduction parameter;

a multiplier to weight the optionally time-delayed audio input signal or weight the prediction output signal by a weighting factor smaller than one to generate a weighted signal: and an adder to add the weighted signal to the prediction output signal to generate a noise-reduced audio output signal.

16. The device of claim 15, where the coefficient supply circuit multiplies the coefficients by the reduction parameter in the form of a factor smaller than one.

17. The device of claim 15, comprising a second filter connected to the adaptive filter to receive the prediction output signal as a predictive measure of the audio input signal with reduced noise as an input signal for the second filter to generate a second prediction.

18. The device of claim 17, further comprising an adder that provides a difference signal indicative of the difference between error predictions of the second filter from the prediction output signal of the first filter in order to generate a prediction output signal.

19. The device of claim 18, further comprising a subtraction circuit to subtract the values of the prediction from the values of the audio input signal to generate a noise-reduced audio output signal.

20. The device of claim 17. where the second filter comprises an LMS adaptation filter to implement error prediction.

21. The device of claim 15, where the first filter comprises a FIR filter.

22. The device of claim 15, which is formed by a field-programmable component or an application specific integrated circuit.

* * * * *